United States Patent
Neria et al.

(10) Patent No.: US 8,213,972 B2
(45) Date of Patent: Jul. 3, 2012

(54) MOBILE ADVERTISING PACKAGES FOR DISPLAYING ADVERTISEMENT DISPLAY MESSAGES ON PERSONAL CELLULAR TELECOMMUNICATIONS DEVICES

(75) Inventors: Uri Neria, Chofit (IL); Offer Markovich, Kfar Saba (IL)

(73) Assignee: Celltick Technologies Ltd., Herzliya (IL)

( * ) Notice: Subject to any disclaimer, the term of this patent is extended or adjusted under 35 U.S.C. 154(b) by 292 days.

(21) Appl. No.: 12/448,254

(22) PCT Filed: Mar. 20, 2007

(86) PCT No.: PCT/IL2007/000357
§ 371 (c)(1),
(2), (4) Date: Jun. 15, 2009

(87) PCT Pub. No.: WO2008/075331
PCT Pub. Date: Jun. 26, 2008

(65) Prior Publication Data
US 2010/0081462 A1    Apr. 1, 2010

(30) Foreign Application Priority Data
Dec. 19, 2006 (IL) .......................... 180168

(51) Int. Cl.
*H04W 4/00* (2009.01)
*H04M 3/42* (2006.01)
(52) U.S. Cl. ................... 455/466; 455/414.1; 455/456.3
(58) Field of Classification Search .................. 455/466, 455/456.3; 705/14.14, 14.58, 14.64
See application file for complete search history.

(56) References Cited

U.S. PATENT DOCUMENTS

| | | | |
|---|---|---|---|
| 5,226,177 | A | 7/1993 | Nickerson |
| 5,553,314 | A | 9/1996 | Grube et al. |
| 5,555,446 | A | 9/1996 | Jasinski |
| 5,687,216 | A | 11/1997 | Svensson |
| 5,692,032 | A | 11/1997 | Seppanen et al. |
| 5,701,580 | A | 12/1997 | Yamane et al. |
| 5,812,647 | A | 9/1998 | Beaumont et al. |
| 5,822,402 | A | 10/1998 | Marszalek |
| 5,870,030 | A | 2/1999 | DeLuca et al. |
| 5,878,033 | A | 3/1999 | Mouly |

(Continued)

FOREIGN PATENT DOCUMENTS
EP    0955779    11/1999
(Continued)

OTHER PUBLICATIONS

Global System for Mobile Communications, Digital Cellular Telecommunications System (Phase 2+) (GSM); Universal Mobile Telecommunications System (UMTS); USIM Application Toolkit (USAT); (3 GPP TS 31.111 (Dec. 2000) version 3.3.0; 1999); pp. 1-136.

(Continued)

*Primary Examiner* — Kent Chang
*Assistant Examiner* — Ngan Pham Lu
(74) *Attorney, Agent, or Firm* — Pearl Cohen Zedek Latzer, LLP

(57) ABSTRACT

Mobile advertising packages offered for sale on personal cellular telecommunications devices for displaying advertisement display messages on personal cellular telecommunications devices. Mobile advertising packages specify the contents of advertisement display messages, and their transmission details including inter alia geographical area, number of exposures, schedule.

14 Claims, 5 Drawing Sheets

U.S. PATENT DOCUMENTS

| | | | |
|---|---|---|---|
| 5,926,104 A | 7/1999 | Robinson | |
| 5,960,366 A | 9/1999 | Duwaer | |
| 6,018,522 A | 1/2000 | Schultz | |
| 6,060,997 A | 5/2000 | Taubenheim et al. | |
| 6,064,376 A | 5/2000 | Berezowski et al. | |
| 6,169,882 B1 | 1/2001 | Amma | |
| 6,173,316 B1 | 1/2001 | De Boor et al. | |
| 6,212,203 B1 | 4/2001 | Anderson et al. | |
| 6,230,019 B1 | 5/2001 | Lee | |
| 6,298,239 B1 | 10/2001 | Yonemoto et al. | |
| 6,341,228 B1 | 1/2002 | Hubbe et al. | |
| 6,363,419 B1 | 3/2002 | Martin, Jr. et al. | |
| 6,370,389 B1 | 4/2002 | Isomursu et al. | |
| 6,385,461 B1 | 5/2002 | Raith | |
| 6,413,160 B1 | 7/2002 | Vancura | |
| 6,416,414 B1 | 7/2002 | Stadelmann | |
| 6,418,308 B1 | 7/2002 | Heinonen et al. | |
| 6,434,398 B1 | 8/2002 | Inselberg | |
| 6,441,720 B1 | 8/2002 | Kawashima | |
| 6,442,529 B1 | 8/2002 | Krishan et al. | |
| 6,443,840 B2 | 9/2002 | Von Kohorn | |
| 6,484,148 B1* | 11/2002 | Boyd | 705/14.64 |
| 6,505,046 B1* | 1/2003 | Baker | 455/456.3 |
| 6,522,876 B1 | 2/2003 | Weiland et al. | |
| 6,522,877 B1 | 2/2003 | Lietsalmi et al. | |
| 6,583,714 B1 | 6/2003 | Gabou et al. | |
| 6,615,039 B1 | 9/2003 | Eldering | |
| 6,628,936 B1 | 9/2003 | Furuya | |
| 6,671,715 B1 | 12/2003 | Langseth et al. | |
| 6,688,982 B2 | 2/2004 | Moodie et al. | |
| 6,745,011 B1 | 6/2004 | Hendrickson et al. | |
| 6,807,254 B1 | 10/2004 | Guedalia et al. | |
| 6,832,314 B1 | 12/2004 | Irvin | |
| 6,968,175 B2 | 11/2005 | Raivisto et al. | |
| 6,970,712 B1 | 11/2005 | Vo | |
| 7,003,327 B1 | 2/2006 | Payne et al. | |
| 7,028,261 B2 | 4/2006 | Smyth et al. | |
| 7,039,423 B2 | 5/2006 | Daniel et al. | |
| 7,096,044 B2 | 8/2006 | Gil et al. | |
| 7,113,809 B2 | 9/2006 | Noesgaard et al. | |
| 7,158,753 B2 | 1/2007 | Kagan et al. | |
| 7,181,225 B1 | 2/2007 | Moton, Jr. et al. | |
| 7,191,343 B2 | 3/2007 | Tuoriniemi et al. | |
| 7,219,123 B1 | 5/2007 | Fiechter et al. | |
| 7,251,476 B2 | 7/2007 | Cortegiano | |
| 7,370,283 B2 | 5/2008 | Othmer | |
| 7,551,913 B1 | 6/2009 | Chien | |
| 7,551,919 B2 | 6/2009 | Cortegiano | |
| 7,561,899 B2 | 7/2009 | Lee | |
| 7,689,167 B2 | 3/2010 | Sengupta et al. | |
| 7,747,264 B2* | 6/2010 | Fiorini | 455/466 |
| 7,752,209 B2* | 7/2010 | Ramer et al. | 707/752 |
| 7,779,023 B2 | 8/2010 | Smyth et al. | |
| 7,801,541 B2 | 9/2010 | Daniel et al. | |
| 7,860,951 B2 | 12/2010 | Gil et al. | |
| 2001/0003099 A1 | 6/2001 | Von Kohorn | |
| 2001/0020957 A1 | 9/2001 | Ringot | |
| 2002/0054090 A1 | 5/2002 | Silva et al. | |
| 2002/0138331 A1 | 9/2002 | Hosea et al. | |
| 2003/0005466 A1 | 1/2003 | Liao | |
| 2003/0013439 A1 | 1/2003 | Daniel et al. | |
| 2003/0065706 A1 | 4/2003 | Smyth et al. | |
| 2003/0181201 A1 | 9/2003 | Bomze et al. | |
| 2003/0191653 A1* | 10/2003 | Birnbaum et al. | 705/1 |
| 2003/0229534 A1 | 12/2003 | Frangione et al. | |
| 2004/0049419 A1 | 3/2004 | Knight | |
| 2004/0077340 A1 | 4/2004 | Forsyth | |
| 2004/0078427 A1 | 4/2004 | Gil et al. | |
| 2004/0127199 A1 | 7/2004 | Kagan et al. | |
| 2004/0157628 A1 | 8/2004 | Daniel et al. | |
| 2005/0015307 A1 | 1/2005 | Simpson et al. | |
| 2005/0060370 A1 | 3/2005 | Xue et al. | |
| 2005/0149618 A1 | 7/2005 | Cheng | |
| 2005/0154996 A1 | 7/2005 | Othmer | |
| 2005/0213511 A1 | 9/2005 | Reece, Jr. et al. | |
| 2005/0222908 A1* | 10/2005 | Altberg et al. | 705/14 |
| 2006/0004627 A1 | 1/2006 | Baluja | |
| 2006/0030370 A1 | 2/2006 | Wardimon | |
| 2006/0064350 A1 | 3/2006 | Freer | |
| 2006/0069611 A1* | 3/2006 | Litt et al. | 705/14 |
| 2006/0160578 A1 | 7/2006 | Daniel et al. | |
| 2006/0190616 A1 | 8/2006 | Mayerhofer et al. | |
| 2006/0204944 A1 | 9/2006 | Preskill | |
| 2006/0234696 A1 | 10/2006 | Cho | |
| 2007/0021065 A1 | 1/2007 | Sengupta et al. | |
| 2007/0055565 A1 | 3/2007 | Baur et al. | |
| 2007/0106557 A1 | 5/2007 | Varghese | |
| 2007/0123246 A1 | 5/2007 | Daniel et al. | |
| 2007/0178889 A1 | 8/2007 | Cortegiano et al. | |
| 2007/0203801 A1* | 8/2007 | Istfan | 705/26 |
| 2007/0218865 A1 | 9/2007 | Daniel et al. | |
| 2007/0218882 A1 | 9/2007 | Daniel et al. | |
| 2007/0218919 A1 | 9/2007 | Ozulkulu et al. | |
| 2007/0276729 A1 | 11/2007 | Freer | |
| 2007/0288856 A1 | 12/2007 | Butlin et al. | |
| 2008/0021783 A1 | 1/2008 | Varghese | |
| 2008/0091518 A1 | 4/2008 | Eisenson et al. | |
| 2008/0139224 A1* | 6/2008 | Stone | 455/456.3 |
| 2008/0160956 A1 | 7/2008 | Jackson et al. | |
| 2008/0160970 A1 | 7/2008 | Srinivas Reddy et al. | |
| 2008/0187112 A1 | 8/2008 | Koberstein et al. | |
| 2009/0150400 A1 | 6/2009 | Abu-Hakima et al. | |
| 2009/0163189 A1 | 6/2009 | Gil et al. | |
| 2010/0016025 A1 | 1/2010 | Koren et al. | |
| 2010/0081462 A1 | 4/2010 | Neria et al. | |
| 2010/0130196 A1 | 5/2010 | Gil et al. | |
| 2010/0312643 A1 | 12/2010 | Gil | |
| 2011/0098091 A1 | 4/2011 | Daniel et al. | |

FOREIGN PATENT DOCUMENTS

| | | |
|---|---|---|
| GB | 2320600 | 6/1998 |
| GB | 2327567 | 1/1999 |
| GB | 2362550 | 11/2001 |
| GB | 2391363 | 2/2004 |
| WO | WO 98/10604 | 3/1998 |
| WO | WO 98/41013 | 9/1998 |
| WO | WO 99/42964 | 8/1999 |
| WO | WO 00/22906 | 4/2000 |
| WO | WO 00/77979 | 12/2000 |
| WO | WO 01/45317 | 6/2001 |
| WO | WO 01/52558 | 7/2001 |
| WO | WO 01/52572 | 7/2001 |
| WO | WO 02/087267 | 10/2002 |

OTHER PUBLICATIONS

Gromakiv, "Mobile Wireless Communication Standards and Systems", Mobile TeleSystems-EcoTrands, (1997), Chapter 4, pp. 67-70, with English translation.

Afanasev, et al., "Evolution of Mobile Networks", (Inventory #5554), Moscow, 2001, pp. 84-87 with English translation.

Office Action issued by the United States Patent and Trademark Office for U.S. Appl. No. 11/798,571 dated Jan. 25, 2010.

Office Action issued by the United States Patent and Trademark Office for U.S. Appl. No. 11/798,571 dated Jun. 28, 2010.

Office Action issued by the United States Patent and Trademark Office for U.S. Appl. No. 11/798,571 dated Dec. 23, 2010.

Office Action issued by the United States Patent and Trademark Office for U.S. Appl. No. 11/798,571 dated Oct. 14, 2011.

Office Action issued by the United States Patent and Trademark Office for U.S. Appl. No. 12/982,686 dated May 2, 2011.

Office Action issued by the United States Patent and Trademark Office for U.S. Appl. No. 11/385,650 dated Jun. 26, 2008.

Office Action issued by the United States Patent and Trademark Office for U.S. Appl. No. 11/385,650 dated Jan. 26, 2009.

Office Action issued by the United States Patent and Trademark Office for U.S. Appl. No. 11/385,650 dated Jun. 8, 2009.

Office Action issued by the United States Patent and Trademark Office for U.S. Appl. No. 11/798,572 dated Jun. 25, 2010.

Office Action issued by the United States Patent and Trademark Office for U.S. Appl. No. 11/798,572 dated Jan. 19, 2010.

Office Action issued by the United States Patent and Trademark Office for U.S. Appl. No. 11/798,572 dated Jan. 21, 2011.

Office Action issued by the United States Patent and Trademark Office for U.S. Appl. No. 11/798,572 dated Oct. 14, 2011.

Office Action issued by the United States Patent and Trademark Office for U.S. Appl. No. 12/223,806 dated Jun. 28, 2011.
Office Action issued by the United States Patent and Trademark Office for U.S. Appl. No. 12/448,211 dated Aug. 18, 2011.
Office Action issued by the United States Patent and Trademark Office for U.S. Appl. No. 12/227,973 dated Sep. 23, 2011.
Office Action issued by the United States Patent and Trademark Office for U.S. Appl. No. 12/452,903 dated Dec. 13, 2011.
Office Action issued by the United States Patent and Trademark Office for U.S. Appl. No. 12/982,686 dated Jan. 12, 2012.

* cited by examiner

MOBILE ADVERTISING PACKAGES FOR DISPLAYING ADVERTISEMENT DISPLAY MESSAGES ON PERSONAL CELLULAR TELECOMMUNICATIONS DEVICES

CROSS-REFERENCE TO RELATED APPLICATIONS

This application is the national phase of International Application Serial Number PCT/IL2007/000357 filed 20 Mar. 2007 designating the United States and published in English, the entire contents of which is incorporated herein in its entirety by reference.

FIELD OF THE INVENTION

The present invention pertains to mobile advertising packages for displaying advertisement display messages on personal cellular telecommunications devices. For the purpose of the present invention, the term "personal cellular telecommunications device" refers to a wide range of portable hand-held electronic devices having small display screens and voice communications capabilities. The term "personal cellular telecommunications device" is intended to include inter alia radio telephones, smart phones, communicators, and the like.

BACKGROUND OF THE INVENTION

Cellular operators display advertisement display messages on personal cellular telecommunications devices as a way of garnering additional revenue or charging subscribers less whilst making up the difference with advertising revenue, and naturally desire to charge as high rates as possible. Advertisement display messages displayed on personal cellular telecommunications devices include a visual component such as text or graphics and may be interactive for enabling a subscriber to request additional information. Advertisement display messages may be downloaded in real time or alternatively they can be stored in a buffer. Advertisement display messages can be time sensitive and location sensitive, and also subscriber sensitive in accordance with a subscriber profile in terms of age, interests, etc.

Advertisers are prepared to pay premium rates for peak time advertising slots and prime advertisement display message positions, for example, at the top of a page, a pop-up banner, and the like. Peak time advertising applies to displaying advertisement display messages on personal cellular telecommunications devices in a similar manner to other advertising media. Against this, prime advertisement display message positioning is hardly applicable to displaying advertisement display messages on personal cellular telecommunications devices due to their small screen size. Moreover, advertisers are prepared to pay additional sums for advertisement display messages which have been viewed to a high degree of certainty.

SUMMARY OF THE INVENTION

Applicant's PCT International Publication No. WO 01/52572, the contents of which are incorporated herein by reference, illustrates and describes a cellular telecommunications network capable of transmitting a multi-programming channel 24/7 cellular broadcasting service to a plurality of individually addressable BTSs each providing bidirectional signal coverage over a predefined geographical area ranging from so-called typically indoor pic cells each covering a few square meters through so-called micro cells each covering anywhere from a few tens to a few hundreds of square meters up to cells covering several square kilometers. The BTSs are each capable of transmitting Point-To-Multipoint (PTMP) display messages and Point-To-Point (PTP) display messages for streaming mostly different content, mostly interactive display messages on personal cellular telecommunications devices. The PTMP display messages are dispatched from a Point-To-Multipoint Display Message Dispatcher and the PTP display messages are dispatched from a Point-To-Point Display Message Dispatcher. Both the PTMP display messages and the PTP display messages originate at a Display Message Input Entity. Programming can be selected by a Programming Channel Allocation Scheme.

WO 01/52572's FIG. 1 shows two exemplary successive time-sensitive interactive display messages displayed in a screen saver-lie manner replacing a normally displayed idle screen. The display messages include "NASDAQ DROPS 10% PRESS SND FOR DETAILS" display at 9:00 and "NASDAQ JUMPS 20%" displayed at 9:01. The 9:00 display message is an example of a display message prompting a subscriber as to the action required by him to obtain additional information from an information provider. Against this, the 9:01 display message is an example of a display message which does not prompt a subscriber as to which action is needed to take to obtain additional information since he is already cognizant of the fact that pressing the SND key will automatically connect him to a suitable information service. Activation of interactive display messages activates a point-to-point transmission response mechanism from the list of a: a voice call; an SMS; a data session, for example, an Internet browsing session, a SIM browsing session, and the like (see WO 01/52572's FIG. 2).

The present invention is directed toward mobile advertising packages for displaying advertisement display messages on personal cellular telecommunications devices. The present invention includes displaying interactive display messages offering mobile advertising packages for displaying advertisement display messages on personal cellular telecommunications devices for sale to subscribers whereupon, on invoking such an interactive display message, an order routine is initiated in which a subscriber can order a mobile advertising package. Mobile advertising packages specify the contents of advertisement display messages, and their transmission details including inter alia geographical area, number of exposures, and schedule. The present invention affords, on the one hand, a convenient and lucrative closed loop sales channel for cellular operators to sell mobile advertising packages to increase their advertising revenues and, on the other hand, convenient means to subscribers cum advertisers to order mobile advertising packages to suit their requirements and advertising budgets.

Order routines can implemented by one or more order mechanisms including inter alia immediately initiating a call to a call center for ordering a mobile advertising package over the phone, immediately browsing to a WAP site for online ordering a mobile adverting package, requesting a link be emailed to a subscriber's email address for online ordering a mobile advertising package at an Internet website, and the like. The subscriber's email address may be pre-stored at a cellular operator, or in his personal cellular telecommunications device in a default email address memory. Alternatively, a subscriber may be required to manually complete his email address before requesting a link be mailed to his email address.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered throughout the several views, and in which.

DETAILED DESCRIPTION OF PREFERRED EMBODIMENTS OF THE INVENTION

Figure 1:
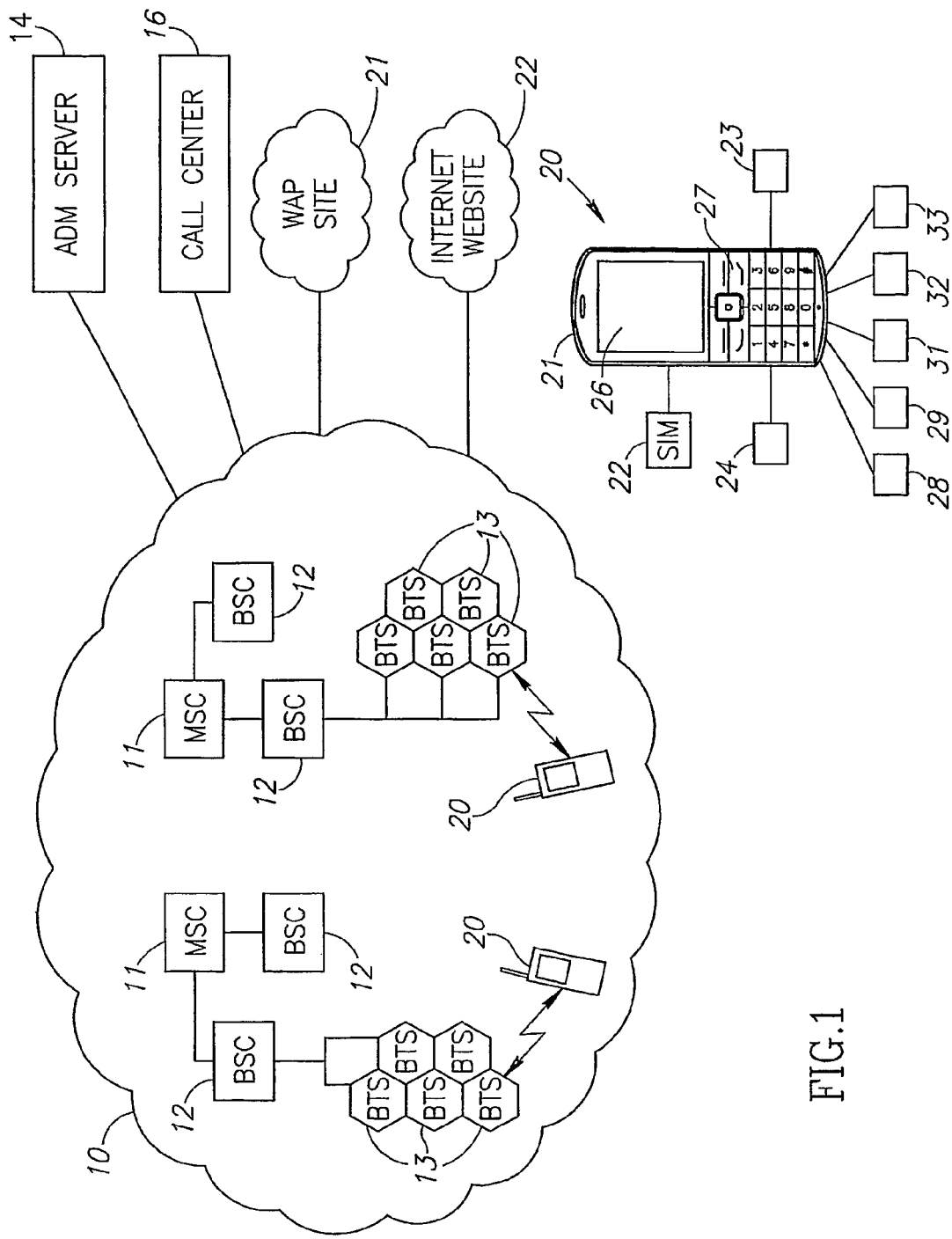
FIG. 1 is a schematic representation of a system for displaying advertisement display messages on personal cellular telecommunications devices.

FIG. 1 shows a cellular telecommunications network 10 including a plurality of MSCs 11, a plurality of BSCs 12, and a plurality of individually addressable BTSs 13 for streaming personalized content on personal cellular telecommunication devices (hereinafter abbreviated to "devices"). The devices 20 include inter alia simple handset phones, smartphones, combined PDA/phones, combined MP3 music players i-phones, and the like. GSM devices 20 include a host Mobile Equipment (ME) 21, and a resident Subscriber Identity Module (SIM) card 22. The host ME 21 has its own unique vendor allocated 15 digit International Mobile Equipment Identification (IMEI) number, for example, 490548400308362. The SIM card 22 has a cellular operated allocated 15 digit International Mobile subscriber Identity (IMSI) number, for example, 425010100437187.

The cellular telecommunications network 10 includes an Advertisement Display Message (ADM) server 14 for storing details regarding mobile advertising packages for displaying advertisement display messages on the devices 20. The ADM server 14 can include details regarding the subscribers who ordered the mobile advertising packages, payment details, and the like. The cellular telecommunications network 10 can be connected to a call center 16 for receiving calls from subscribers cum advertisers who are interested in ordering mobile advertising packages over the phone. The cellular telecommunications network 10 can be connected to a WAP site 17 for enabling subscribers to online order mobile advertising packages. The cellular telecommunications network 10 can be connected to an Internet website 18 for enabling subscribers to online order mobile advertising packages.

The devices 20 include a cellular network interface 23 for bi-directional interfacing with the cellular telecommunications network 10, an operating system 24 in communication with the cellular network interface 23, a display screen 26, a user interface 27 for inputting instructions, and a memory 28 for storing a buffer 29 of at least one advertisement display message. The devices 20 include an Advertisement Display Message Selection Module (ADMSM) 31 for selecting advertisement display messages for display purposes in accordance with a selection scheme, and an Advertisement Display Message Deletion Module (ADMDM) 32 for deleting advertisement display messages from the buffer 29 in accordance with a deletion scheme. The devices 20 preferably include a Subscriber Content Filter (SCF) 33 for storing a subscriber's individual content filters for preventing unwanted content from being displayed thereon.

Figure 2:
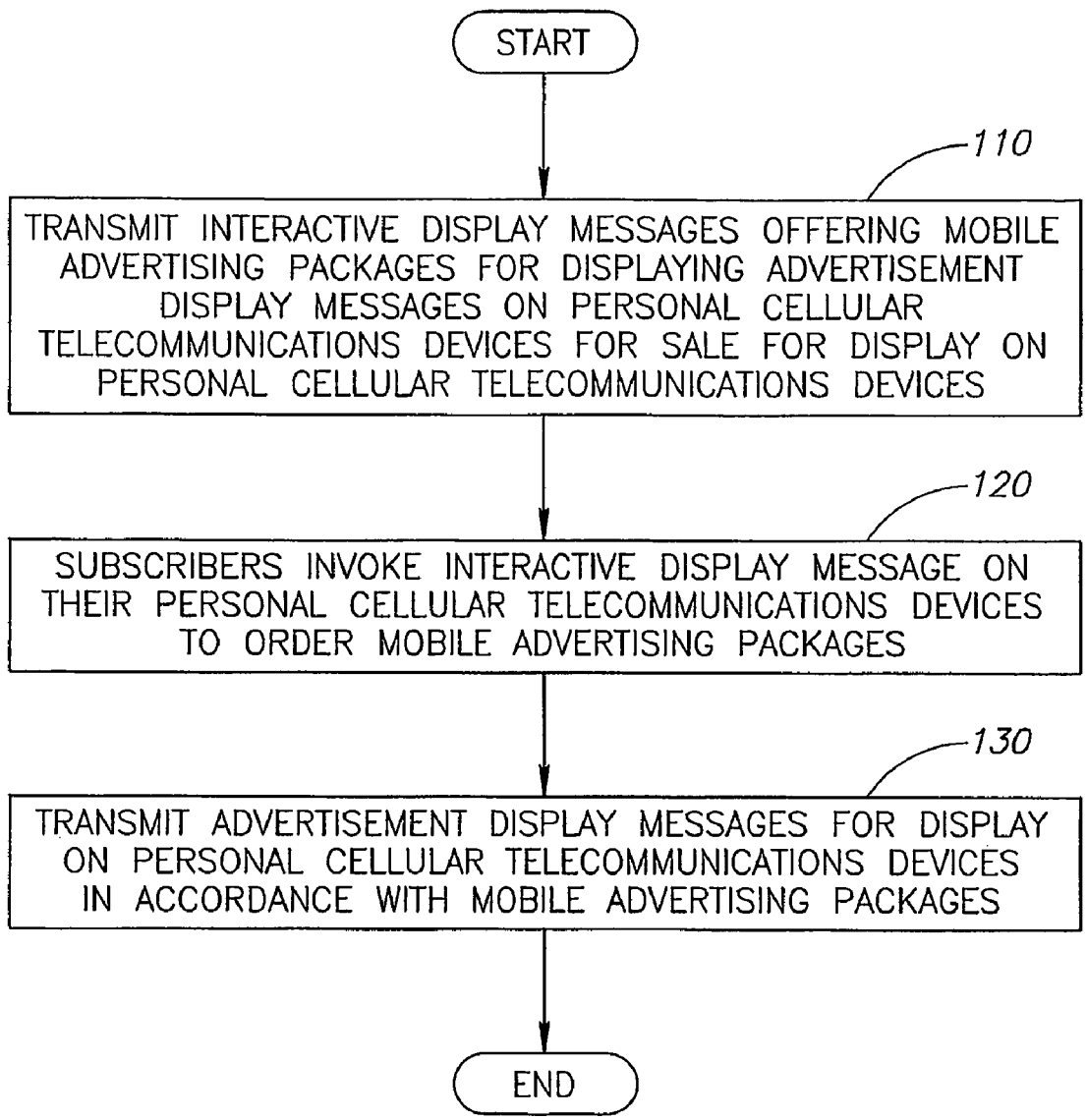
FIG. 2 is a flow diagram of a method for displaying advertisement display messages on personal cellular telecommunications devices.

FIG. 2 is a flow diagram for displaying advertisement display messages on personal cellular telecommunications devices. The method includes a Step 100: the cellular telecommunications network 10 transmitting interactive display messages offering mobile advertising packages for sale for display on the devices 20. The interactive display messages include at least one response mechanism for initiating an order routine. Interactive display messages can be transmitted either PTMP or PTP. The method includes a Step 120: on a subscriber invoking an interactive display message, a subscriber orders a mobile advertising package specifying the contents of an advertisement display message, and transmission details including inter alia geographical area, number of exposures and schedule the advertisement display message is to be broadcast. The method includes a Step 130: the cellular telecommunications network 10 transmitting advertisement display messages for display on devices 20 in accordance with the mobile advertising packages. Advertisement display messages can be transmitted by PTMP or PTP.

Figure 5:
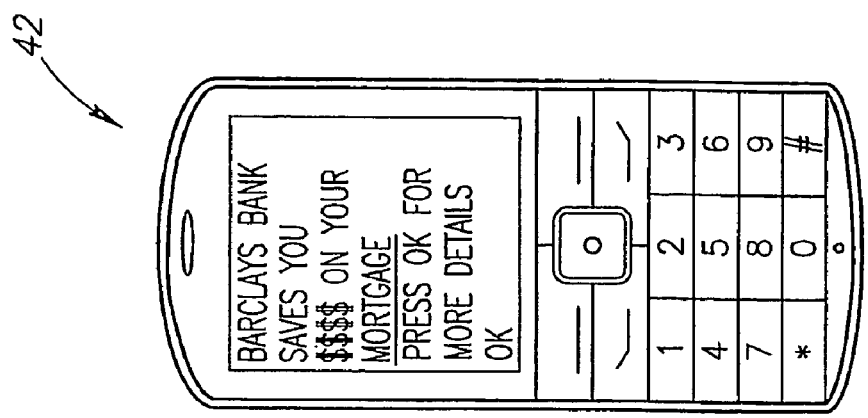
FIG. 5 is a schematic representation of a personal cellular telecommunications device displaying an interactive advertisement display message.
Figure 4:
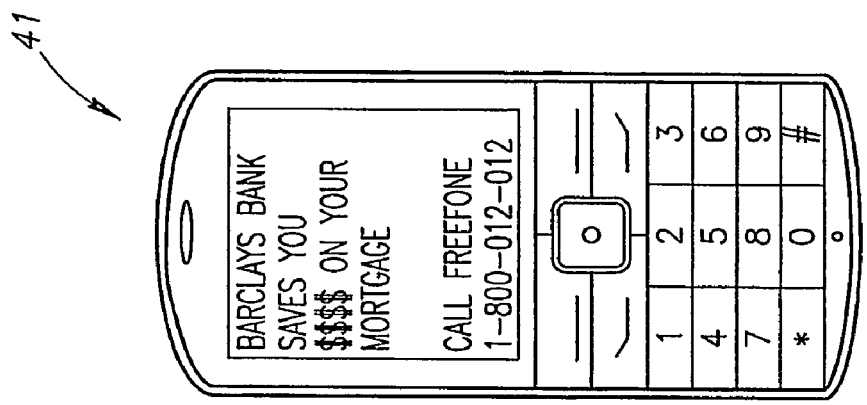
FIG. 4 is a schematic representation of a personal cellular telecommunications device displaying an advertisement display message.
Figure 3:
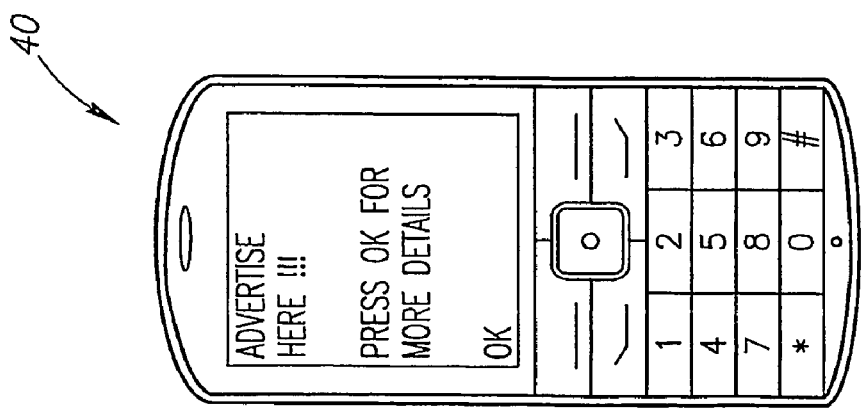
FIG. 3 is a schematic representation of a personal cellular telecommunications device displaying an interactive display message offering mobile advertising packages for sale.

FIG. 3 shows an exemplary interactive display message 40 offering mobile advertising packages for sale. FIG. 4 shows an exemplary 30 advertisement display message 41 advertising cost savings on mortgages at Barclays Bank. Subscribers are required to call 1-800-012-012. Contents of such advertisement display messages may be text, a logo, a Multimedia Messaging Service (MMS), and the like. FIG. 5 shows an exemplary interactive advertisement display message 42 for the same advertisement but simply requiring that a subscriber press OK to initiate a call. Invoking interactive advertisement display messages may initiate a call to a call center, browse to a WAP site, and the like.

Figure 7:
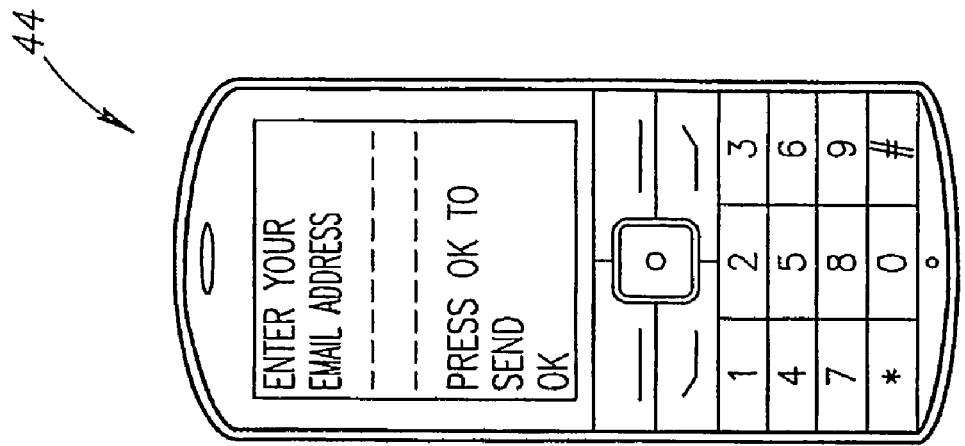
FIG. 7 is a schematic representation of a personal cellular telecommunications device displaying an interactive display message for a subscriber to complete his email address.
Figure 6:
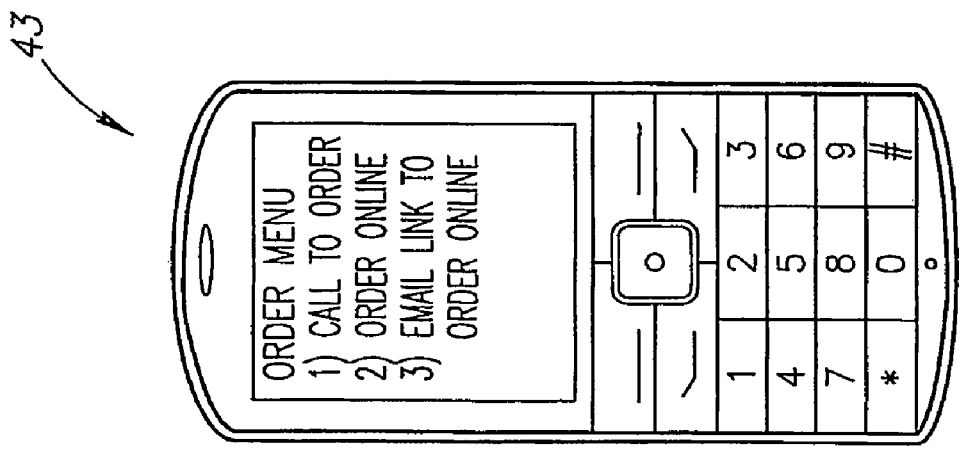
FIG. 6 is a schematic representation of a personal cellular telecommunications device displaying an interactive order menu for ordering a mobile advertising package.
Figure 8:
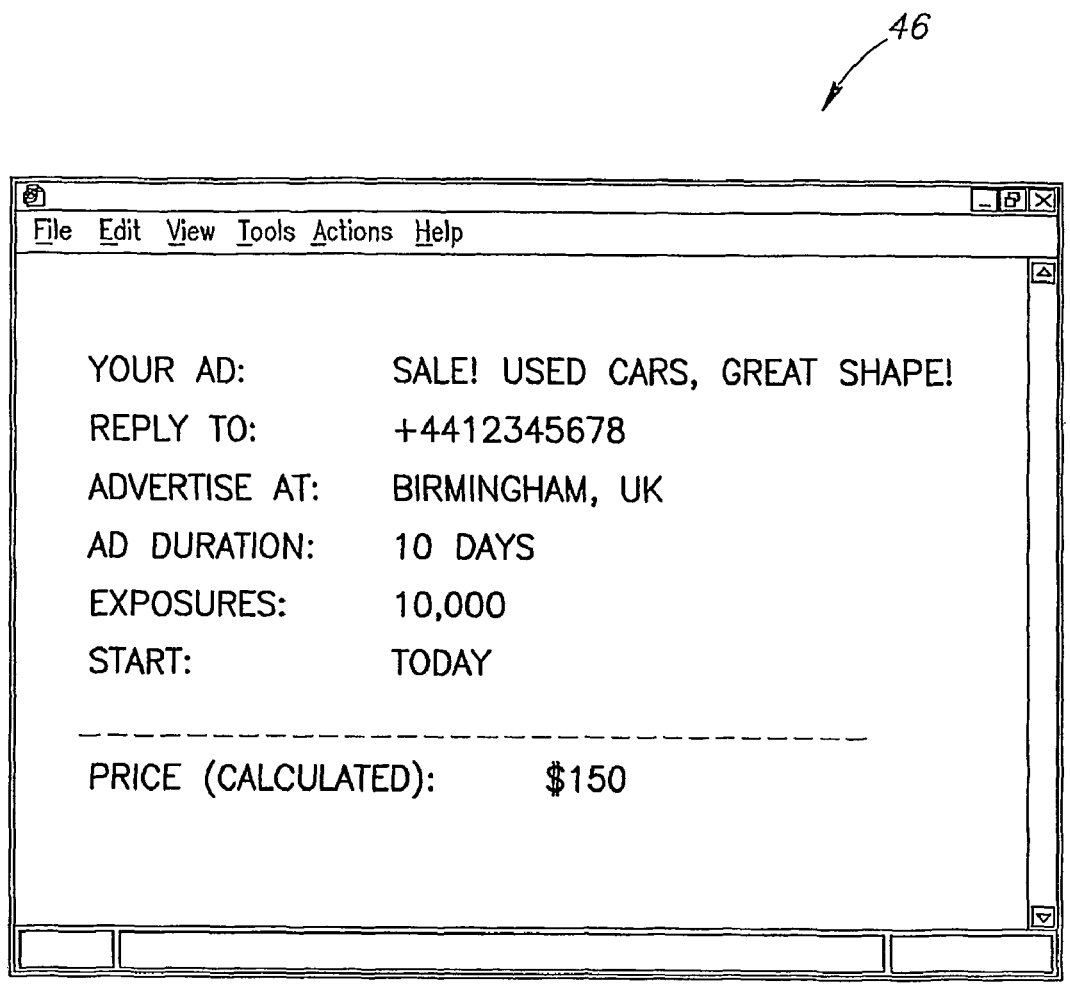
FIG. 8 is a schematic representation of an Internet website for online ordering mobile advertising packages for displaying advertisement display messages on personal cellular telecommunications devices.

FIG. 6 shows an interactive order menu 43 providing a subscriber different options for ordering a mobile advertising package. One such option 10 includes immediately initiating a call to the call center 16 for ordering a mobile advertising package over the phone. Another such option includes immediately browsing to the WAP site 17 for online ordering a mobile advertising package. Still another such option includes requesting a link to the Internet website 18 to be forwarded to the subscriber's email address for online ordering mobile 15 advertising packages. The subscriber's email address may be pre-stored at a cellular operator, or may be a default email address pre-stored in his personal cellular telecommunications device. Alternatively, FIG. 7 shows an interactive display message 44 requiring a subscriber to manually complete his email address. FIG. 8 shows an exemplary GUI 46 for ordering a mobile advertising 20 package at the Internet website 18.

While the invention has been described with respect to a limited number of embodiments, it will be appreciated that many variations, modifications, and other applications of the invention can be made within the scope of the appended claims.

The invention claimed is:

1. Method for displaying advertisement display messages on personal cellular telecommunications devices, the method comprising the steps of:
   (a) transmitting over a cellular telephone network a cellular interactive display message to a plurality of personal cellular telecommunications devices for display thereon, said cellular interactive display message offering for sale mobile advertising packages for displaying cellular advertisement display messages on at least some of said plurality of personal cellular telecommunications devices;
   (b) on a subscriber invoking the cellular interactive display message on his personal cellular telecommunications device, initiating on said personal cellular telecommunications device an order routine for ordering a mobile advertising package over the cellular telephone network, said order routine including specifying (i) the contents of a cellular advertisement display message, (ii) the geographical area in which the cellular advertisement display message is to be transmitted, and (iii) the schedule when the contents of the cellular advertisement display message are to be transmitted; and
   (c) transmitting over the cellular telephone network cellular advertisement display messages including said contents to at least some of said plurality of personal cellular telecommunications devices in the specified geographical area for displaying said contents thereon based on the specified schedule in accordance with the mobile advertising package ordered by said subscriber in the order routine.

2. The method as claimed in claim 1 wherein the mobile advertising package ordered in the order routine specifies transmission details including at least the number of exposures the cellular advertisement display message is to be transmitted.

3. The method as claimed in claim 1 wherein invoking the cellular interactive display message initiates a call to a call center for ordering a mobile advertising package over the phone.

4. The method as claimed in claim 1 wherein invoking the cellular interactive display message browses to a WAP site for online ordering a mobile advertising package.

5. The method as claimed in claim 1 wherein invoking the cellular interactive display message transmits a request for forwarding a link to a subscriber's email address for online ordering a mobile advertising package at an Internet website.

6. The method as claimed in claim 5 wherein a subscriber manually completes a cellular interactive display message with his email address prior to transmitting the request for forwarding the link.

7. The method as claimed in claim 1 wherein invoking the cellular interactive display message displays an interactive order menu with at least two different options for ordering a mobile advertising package.

8. Personal cellular telecommunications device comprising:
   (a) a cellular network interface for interfacing with a cellular telecommunications network transmitting to a plurality of personal cellular telecommunications devices a cellular interactive display message for display thereon, said cellular interactive display message offering for sale mobile advertising packages for displaying cellular advertisement display messages on at least some of said personal cellular telecommunications devices; and
   (b) an operating system communicating with said cellular network interface for receiving the cellular interactive display message over the cellular telecommunications network and displaying the cellular interactive display message whereupon a subscriber invoking the cellular interactive display message initiates on said personal cellular telecommunications device an order routine for ordering a mobile advertising package for displaying a cellular advertisement display message on at least some of said plurality of personal cellular telecommunications device wherein said order routine includes specifying (i) the contents of a cellular advertisement display message, (ii) the geographical area in which the cellular advertisement display message is to be transmitted, and (iii) the schedule when the contents of the cellular advertisement display message are to be transmitted,
   wherein said cellular network interface is further for interfacing with said cellular telecommunications network transmitting over the cellular telecommunications network to a plurality of personal cellular telecommunications devices in the specified geographical area cellular advertisement display messages displaying said contents based on the schedule specified in accordance with the mobile advertising package ordered by said subscriber in the order routine.

9. The device as claimed in claim 8 wherein a mobile advertising package specified in the order routine specifies transmission details including at least the number of exposures the cellular advertisement display message is to be transmitted.

10. The device as claimed in claim 8 wherein invoking the cellular interactive display message initiates a call to a call center for ordering a mobile advertising package over the phone.

11. The device as claimed in claim 8 wherein invoking the cellular interactive display message browses to a WAP site for online ordering a mobile advertising package.

12. The device as claimed in claim 8 wherein invoking the cellular interactive display message transmits a request for forwarding a link to a subscriber's email address for ordering a mobile advertising package at an Internet website.

13. The device as claimed in claim 12 wherein the subscriber manually completes a cellular interactive display message with his email address prior to transmitting the request to forward the link.

14. The device as claimed in claim 8 wherein invoking the cellular interactive display message displays an interactive order menu with at least two different options for ordering a mobile advertising package.

* * * * *